United States Patent
Karlsson (10) Patent No.: US 12,239,042 B2
(45) Date of Patent: Mar. 4, 2025

(54) AGRICULTURAL IMPLEMENT, A COMPUTER PROGRAM, A COMPUTER-READABLE MEDIUM AND A METHOD FOR DETECTING ABNORMAL PRODUCT FLOW IN SUCH AN AGRICULTURAL IMPLEMENT

(71) Applicant: VÄDERSTAD HOLDING AB, Väderstad (SE)

(72) Inventor: Astrid Karlsson, Mjölby (SE)

(73) Assignee: VADERSTAD HOLDING AB, Väderstad (SE)

( * ) Notice: Subject to any disclaimer, the term of this patent is extended or adjusted under 35 U.S.C. 154(b) by 262 days.

(21) Appl. No.: 17/905,320

(22) PCT Filed: Mar. 5, 2021

(86) PCT No.: PCT/SE2021/050200
§ 371 (c)(1),
(2) Date: Aug. 30, 2022

(87) PCT Pub. No.: WO2021/183027
PCT Pub. Date: Sep. 16, 2021

(65) Prior Publication Data
US 2023/0309438 A1    Oct. 5, 2023

(30) Foreign Application Priority Data

Mar. 10, 2020   (SE) .................................... 2030069-5

(51) Int. Cl.
*A01C 7/10*   (2006.01)
(52) U.S. Cl.
CPC .................................... *A01C 7/102* (2013.01)
(58) Field of Classification Search
None
See application file for complete search history.

(56) References Cited

U.S. PATENT DOCUMENTS 4,354,775 A * 10/1982 Jalas .................... B65G 53/521
                                                           406/3
5,775,585 A *  7/1998 Duello .................... A01C 15/04
                                                           239/654
(Continued)

FOREIGN PATENT DOCUMENTS

DE   102009025744 A1   11/2010
EP       3574757 A1   12/2019
(Continued)

OTHER PUBLICATIONS

International Searching Authority, International Search Report and Written Opinion received for International Application No. PCT/SE2021/050200, dated Jun. 9, 2021, 14 pages, European Patent Office, Netherlands.

(Continued)

*Primary Examiner* — Joseph A Dillon, Jr.
(74) *Attorney, Agent, or Firm* — Alston & Bird LLP (57) ABSTRACT

The disclosure relates to a method, performed by a control device (100), for detecting abnormal product flow in an agricultural implement (1) comprising a feed system (10) for an agricultural product (5). The feed system (10) comprises: a first flow path (12); an air flow generating unit (14) arranged in fluid communication with the first flow path (12); a primary metering device (16) arranged to provide the agricultural product (5) to the air flow in the first flow path (12); and at least one distribution unit (20). The at least one distribution unit (20) comprises at least two outlets (22), each connected to a separate duct (24) for conveying the agricultural product (5) to the ground. The feed system (10) comprises sensor units (30) arranged in at least two ducts (24). The method comprises: determining (s110) a static pressure in each of the at least two ducts (24) based on signals from the sensor units (30); and comparing (s120) the determined static pressures to detect whether any of the at (Continued)

least two ducts (24) has a deviating static pressure, indicating an abnormal product flow in said duct (24). The disclosure further relates to a computer program (P), a computer-readable medium and an agricultural implement (1).

11 Claims, 5 Drawing Sheets

(56) References Cited

U.S. PATENT DOCUMENTS

| | | | |
|---|---|---|---|
| 8,746,158 B2* | 6/2014 | Binsirawanich | A01C 7/081 |
| | | | 702/45 |
| 8,928,486 B2* | 1/2015 | Hui | A01C 7/102 |
| | | | 56/10.2 J |
| 9,615,506 B2* | 4/2017 | Ruppert | A01M 9/0053 |
| 10,246,274 B2* | 4/2019 | Bent | B65G 53/4633 |
| 10,398,076 B1 | 9/2019 | Rempel et al. | |
| 10,421,625 B2* | 9/2019 | Henry | A01C 7/082 |
| 10,549,932 B2* | 2/2020 | Henry | A01C 7/206 |
| 10,863,666 B2* | 12/2020 | Stark | G01F 25/10 |
| 10,980,169 B2* | 4/2021 | Schoeny | A01C 23/047 |
| 11,032,965 B2* | 6/2021 | Klein | A01C 7/107 |
| 11,980,122 B2* | 5/2024 | Thompson | A01C 7/082 |
| 2011/0035163 A1* | 2/2011 | Landphair | A01C 7/105 |
| | | | 702/45 |
| 2014/0049395 A1 | 2/2014 | Hui et al. | |
| 2014/0350752 A1 | 11/2014 | Gelinske et al. | |
| 2015/0366127 A1* | 12/2015 | Roberge | A01C 15/04 |
| | | | 239/11 |
| 2016/0000004 A1* | 1/2016 | Ni | B05B 12/008 |
| | | | 73/204.11 |
| 2016/0088791 A1* | 3/2016 | Horsch | A01C 7/102 |
| | | | 111/149 |
| 2016/0128270 A1 | 5/2016 | Ruppert et al. | |
| 2016/0212933 A1 | 7/2016 | Block et al. | |
| 2019/0000011 A1 | 1/2019 | Gervais et al. | |
| 2019/0077612 A1 | 3/2019 | Henry | |
| 2023/0094915 A1* | 3/2023 | Thompson | A01C 7/105 |
| | | | 111/174 |
| 2024/0164244 A1* | 5/2024 | Karlsson | A01C 7/081 |

FOREIGN PATENT DOCUMENTS

| | | |
|---|---|---|
| EP | 3603368 A1 | 2/2020 |
| WO | WO 2014/098749 A1 | 6/2014 |

OTHER PUBLICATIONS

Swedish Patent and Registration Office, Swedish Search Report and Written Opinion received for Application No. 2030069-5, dated Oct. 22, 2020, 9 pages, Sweden.

* cited by examiner

AGRICULTURAL IMPLEMENT, A COMPUTER PROGRAM, A COMPUTER-READABLE MEDIUM AND A METHOD FOR DETECTING ABNORMAL PRODUCT FLOW IN SUCH AN AGRICULTURAL IMPLEMENT

CROSS REFERENCE TO RELATED APPLICATIONS

This application is a National Stage Application, filed under 35 U.S.C. § 371, of International Application No. PCT/SE2021/050200, filed Mar. 5, 2021, which international application claims priority to and the benefit of Swedish Application No. 2030069-5, filed Mar. 10, 2020; the contents of both of which as are hereby incorporated by reference in their entirety.

BACKGROUND

Related Field

The present invention relates to an agricultural implement and a method for detecting abnormal product flow in such an agricultural implement. More specifically, the disclosure relates to an agricultural implement comprising a feed system for distributing an agricultural product. Furthermore, the invention relates to a computer program and a computer-readable medium.

Description of Related Art

Agricultural implements for crop production, such as seeding or fertilizing implements, are generally towed by a tractor or work vehicle. The agricultural implements distribute seeds, fertilizers or pesticides by means of a feed system to the ground, where the crops grow. The feed system typically include one or more delivery lines that carry particulate from a product storage tank to product outlets at the ground. The transport of the agricultural product through the feed system may often be controlled by airflow and gravity. The performance and precision of the feed system is of major importance in improving efficiency of agricultural yield.

Configuration and control of the feed system for enabling control of the precision of seed spacing, seed depth and no overlap planting is thus essential. Also, a reliable and efficient product flow within the feed system is a key feature for successful crop production. However, when particulate moves through the feed system, abnormal flow and/or blockage may arise within the system. Reasons for such abnormalities may be that seeds or fertilizers have clogged the delivery lines, or that soil from the ground has blocked the product outlets. Blockage or abnormal flow causes uneven delivery of product and thus reduce crop yields. The effects of blockage may also be very time consuming, since the blockage has to be located and resolved, often manually by the driver of the tractor. It is thus crucial that any blockage or abnormal flow in the feed system is detected at an early stage, so that suitable measures can be taken to solve the problem.

One known solution for controlling product flow in an agricultural implement is disclosed in document WO 2014/098749 A1. The document discloses a method for controlling an agricultural implement comprising a feed device for feeding granular or powdery material.

BRIEF SUMMARY

An object of the present disclosure is thus to achieve an advantageous agricultural implement and method for efficient distribution of an agricultural product. Another object of the present disclosure is to achieve a reliable detection of abnormal product flow. Other objects are to achieve a new and advantageous computer program and computer-readable medium.

The herein mentioned objects are achieved by a method for detecting abnormal product flow, a computer program, a computer-readable medium, and an agricultural implement, according to the appended independent claims.

Hence, according to an aspect of the present disclosure, a method, performed by a control device, for detecting abnormal product flow in an agricultural implement is provided. The agricultural implement comprises a feed system for an agricultural product. The feed system comprises: a first flow path; an air flow generating unit arranged in fluid communication with the first flow path; a primary metering device arranged to provide the agricultural product to the air flow in the first flow path; and at least one distribution unit connected to the first flow path downstream of the primary metering device, wherein the at least one distribution unit comprises at least two outlets, each connected to a separate duct for conveying the agricultural product to the ground, wherein the feed system further comprises sensor units arranged in at least two ducts. The method comprises: determining a static pressure in each of the at least two ducts based on signals from the sensor units; and comparing the determined static pressures to detect whether any of the at least two ducts has a deviating static pressure, indicating an abnormal product flow in the duct.

According to an aspect, a computer program comprising instructions which, when the program is executed by a computer, cause the computer to carry out the method according to the method as disclosed herein, is provided.

According to an aspect, a computer-readable medium comprising instructions which, when executed by a computer, cause the computer to carry out the method according to the method as disclosed herein, is provided.

According to an aspect, an agricultural implement comprising a feed system for distributing an agricultural product is provided. The feed system comprises: a first flow path; an air flow generating unit arranged in fluid communication with the first flow path; a primary metering device arranged to provide the agricultural product to the air flow in the first flow path; and at least one distribution unit connected to the first flow path downstream of the primary metering device, wherein the at least one distribution unit comprises at least two outlets, each connected to a separate duct for conveying the agricultural product to the ground, wherein the feed system further comprises sensor units arranged in at least two ducts, wherein the agricultural implement further comprises a control device configured to determine a static pressure in each of the at least two ducts based on signals from the sensor units; and compare the determined static pressures to detect whether any of the at least two ducts has a deviating static pressure, indicating an abnormal product flow in the duct.

Feed systems for an agricultural product may involve multiple flow paths for feeding the agricultural product from a storage tank/container to one or more product outlets of one or more ducts. At the product outlets close to the ground, placement devices such as a coulters may be arranged, which ensures that the agricultural product is placed in or on the ground/soil. Coulters typically comprise one or more discs or tines and other devices for placing the agricultural product into the soil. With product outlets close to the soil, there is a risk that soil enters the ducts and thereby causes a blockage and thus an abnormal product flow. Other reasons for abnormal product flow may be product build-up in the duct, lumps in the agricultural product, uneven dosing of agricultural product, an unintentional pinch or fold of the duct etc.

Disturbances in product flow, for example caused by partial or complete blockage in any of the ducts, will affect the flow of agricultural product into the clogged or affected duct and thus the amount of agricultural product being discharged via said duct. Partial or complete blockage in any of the ducts will also affect the flow of agricultural product in the other ducts. For example, if the flow in one of the ducts is blocked, the flow in the other ducts may be affected, since the air and agricultural product within the system has to find other flow paths. Some of the product outlets may thus not deliver any product at all, while some other outlets may distribute too much. Disturbances of product flow may in turn lead to more disturbances and/or blockage, due to product build up within the feed system. Consequently, the performance and precision of distributing agricultural product evenly over the ground is significantly reduced, and thereby the crop yield.

When the product flow in a duct conveying agricultural products towards the ground is affected by e.g. blockage of soil or agricultural product, the flow through the duct will decrease and the dynamic pressure in that duct will thereby decrease and the static pressure will increase. By arranging sensor units in each duct and continuously measuring the static pressure in each duct, the static pressure of the ducts can be compared with each other and abnormal product flow in a duct can thereby be detected. Thus, the static pressure in one duct is compared with the static pressure of at least one other duct. The static pressure in open ducts (with no disturbances or blockage) will essentially be the same and by comparing the static pressure in the different ducts, a deviation in static pressure will easily be detected. Thus, when the static pressure in one duct deviates from the static pressure of the other ducts, it can be concluded that the deviating duct has been affected in some way, by e.g. blockage. Another parameter that may affect the static pressure in the different ducts and thus indicate an abnormal product flow may for example be leakage within the feed system. Such leakage may for example arise if a duct is disconnected from the distribution unit or if the duct is damaged. With a leakage, the flow through the duct will increase, the dynamic pressure will increase and the static pressure will decrease. Agricultural product will then be jetted out at the wrong place. The product flow of the other ducts may in such cases also be negatively affected, since the leakage may affect the balance of product flow within the whole feed system.

By means of the present disclosure, efficient detection of abnormal flow in the feed system is achieved. On the basis of said detection, suitable measures can be taken to resolve the cause of the disrupted product flow. Consequently, a more uniform and reliable distribution of agricultural product is achieved, and thereby an increased crop yield. An increased crop yield leads to higher profits. A uniform and controlled distribution of agricultural product has also other advantages, such as environmental benefits since the risk of overfertilization or unwanted pesticide emissions are reduced. Also, due to increased control of product flow, less agricultural product, such as seeds, goes to waste. Other synergy effects are that the time for distributing agricultural product is reduced, since the time for unexpected disturbances and maintenance is reduced. This significantly reduces the cost in respect to both financial and human assets.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE FIGURES

For fuller understanding of the present invention and further objects and advantages of it, the detailed description set out below should be read together with the accompanying drawings, in which the same reference notations denote similar items in the various drawings, and in which.

DETAILED DESCRIPTION OF VARIOUS EMBODIMENTS

The present disclosure will be described in further detail below. It is to be understood that all the various examples of the agricultural implement also applies for the method for detecting abnormal product flow in such an agricultural implement, and vice versa. The same applies for the computer program and the computer-readable medium.

According to an aspect of the present disclosure, a method, performed by a control device, for detecting abnormal product flow in an agricultural implement is provided. The agricultural implement comprises a feed system for an agricultural product. The feed system comprises: a first flow path; an air flow generating unit arranged in fluid communication with the first flow path; a primary metering device arranged to provide the agricultural product to the air flow in the first flow path; and at least one distribution unit connected to the first flow path downstream of the primary metering device, wherein the at least one distribution unit comprises at least two outlets, each connected to a separate duct for conveying the agricultural product to the ground, wherein the feed system further comprises sensor units arranged in at least two ducts. The method comprises: determining a static pressure in each of the at least two ducts based on signals from the sensor units; and comparing the determined static pressures to detect whether any of the at least two ducts has a deviating static pressure, indicating an abnormal product flow in said duct.

The agricultural implement may comprise a planter, a seed drill, a fertilizing applicator, a pesticide applicator and/or any other similar devices. The agricultural product may comprise seeds, fertilizer, pesticides and/or other similar products. The agricultural product may comprise granular, particulate and/or powdery material. The air flow generating unit may comprise a fan, pump or blower. The air flow generating unit may comprise a hydraulically driven fan.

The first flow path may be arranged between the air flow generating unit and the distribution unit. The primary metering device may be arranged between the air flow generating unit and the distribution unit. The primary metering device may be arranged downstream of the air flow generating unit and/or upstream of the distribution unit. The primary metering device may be configured to supply the agricultural product to the air flow generated by the air flow generating unit. The primary metering device may be controlled to regulate the amount of agricultural product supplied into the air flow in the first flow path. The primary metering device may be arranged to feed agricultural product from a product chamber into the first flow path for feeding the agricultural product to the ducts. The product chamber may be essentially funnel shaped with inner walls sloping towards the primary metering device, so that agricultural product stored in the product chamber falls down towards the primary metering device by the influence of gravity. The product chamber may be a seed box or a fertilizer box. The product chamber may be a combined seed and fertilizer box, comprising a separate chamber for seeds and a separate chamber for fertilizer. The primary metering device may comprise a rotating dosing element, such as a rotating cell wheel or a feed screw. The speed and direction of the rotating dosing element affect the feed rate of agricultural product into the first flow path. The speed and direction of the rotating dosing element may be regulated by means of a drive unit. The speed and direction of the rotating dosing element may be based on a desired distribution rate and the speed at which the agricultural implement is moving. The desired distribution rate may be a desired amount of agricultural product per unit of surface area. The drive unit driving the rotating dosing element may be controlled by the control device.

Downstream of the primary metering device, the feed system may comprise one or more distribution units with a plurality of outlets. The distribution unit may also be called distribution manifold, distribution head or distributor. The distribution unit may be arranged downstream of the air flow generating unit and the primary metering device. The at least one distribution unit comprises at least two outlets, often more than two outlets. It is not unusual that the at least one distribution unit comprises up to 40 outlets. Each outlet of the distribution unit may be connected to a first end of a separate duct leading the agricultural product to a coulters and/or the ground. The second end of each duct may be arranged in association with a coulter and/or some sort of outlet nozzle and is thus arranged close to the soil in order to discharge the agricultural product. The distribution unit may transfer the product flow from the first flow path to the at least two ducts. Each duct may be referred to as a second flow path. Thus, there may be multiple separate ducts, i.e. multiple second flow paths. Thus, the first flow path conveys air and agricultural product to the distribution unit, while the second flow paths may convey agricultural product from the distributing unit towards the ground. According to an example, one or more of the at least two separate ducts may branch out and split into multiple sub-ducts.

According to an example, the feed system may comprise multiple first flow paths. The multiple first flow paths may each have a separate air flow generating device, or share the same air flow generating device. The multiple first flow paths may each have a separate primary metering device, or share the same primary metering device.

According to an example, the primary metering device and the distribution unit may be comprised in a single entity. According to an example, the primary metering device, the distribution unit and the product chamber may be comprised in a single entity.

The sensor units may be arranged in at least two ducts, wherein at least one sensor unit is arranged in each of the at least two ducts. In the event that the feed system comprises multiple ducts, a sensor unit may be arranged in each duct. Alternatively, a sensor unit may be arranged in a majority of the ducts or in at least two of the ducts. The sensor units may be arranged in association with the distribution unit. Each duct may comprise a first end with a product inlet and a second end with a product outlet, wherein the product inlet is connected to the distribution unit. The sensor unit may thus be arranged close to the product inlet of the duct. Each sensor unit may be arranged in the periphery of the duct. The sensor units may comprise a probe, such as a pitot tube or any other suitable measuring device not interrupting the product flow. According to an example, there may be more than one sensor unit in each duct. More than one sensor in each duct may be useful as back-up, in case one of the sensors malfunctions.

By means of the method step of determining a static pressure in each of the at least two ducts based on signals from the sensor units, a value of current static pressure in each of the at least two ducts are determined. By comparing the determined values of static pressure, deviating static pressure in any of the at least two ducts is detected. The deviation thus corresponds to, and indicates, an abnormal product flow in the duct with a deviating static pressure. Abnormal product flow in the duct may be caused by blockage and/or leakage in the duct. The blockage may be a partial blockage or a complete blockage. Normal product flow may be considered to be a condition when there is no significant blockage or leakage in any of the at least two ducts and the agricultural product is efficiently conveyed by air through the ducts. The comparative value of static pressure between at least two ducts may be expressed as a ratio. The relative difference between the static pressure in the at least two ducts may be used as a quantitative indicator of quality assurance and quality control for repeated measurements where the outcomes are expected to be essentially the same during normal product flow. A deviating relative difference between the at least two ducts thus indicates that there may be a blockage or leakage in at least one of the at least two ducts.

By means of determining the static pressure in each of the at least two ducts and comparing the determined static pressures, an efficient detection of abnormal flow in any of the at least two ducts is obtained. Due to the comparative step, a sensitive while robust detection model is achieved. Comparison of static pressure in at least two different ducts is advantageous, since the driver or operator may be guaranteed that if abnormal flow is detected, the disturbance is traceable to the ducts. In case of other defects, such as the air flow generating unit malfunctioning, or the first flow path or distribution unit being clogged, the static pressure in the ducts may be changed but it may be essentially the same in all ducts so no deviation between the ducts will be detected. Also, during start of operation of the air flow generating unit, pressure variations may arise within the feed system. However, as the pressure variations should be more or less the same for all ducts during start up, such variations would not be inaccurately detected as disturbances arising in the ducts. Thus, the detection method will only indicate abnormal product flow due to disturbances relating to the ducts, not abnormal product flow originating from disturbances upstream of the ducts. Thereby, a detection method with high credibility is obtained. The detection method is also simple, reliable and cost-effective.

The control device is configured to detect abnormal product flow in the agricultural implement. The control device may be arranged in communication with the air flow generating unit, the primary metering device and the sensor units. The control device may be arranged to receive signals corresponding to the static pressure in the at least two ducts from the sensor units. Prior to operation, the user may, via a user interface communicating with the control device, input data corresponding to the type of agricultural product (e.g. type of crop, fertilizer or pesticide) to be distributed by the agricultural implement, as well as a desired distribution rate. The desired distribution rate may be the amount of agricultural product per unit of surface area to be distributed. The desired distribution rate of the agricultural product may be obtained by regulating the output of the primary metering device and/or the air flow generating unit on the basis of the current speed of the agricultural implement. The speed of the agricultural implement may correspond to the speed of the tractor or working vehicle hauling the agricultural implement. The control device may thus also be arranged in communication with a speed sensor for determining the current speed of the agricultural implement or the current speed of the tractor or working vehicle. The control device may comprise a memory. The control device may thus be configured to receive input from interfaces, signals from sensor units regarding e.g. static pressure in at least two ducts and speed of the agricultural implement, and predetermined parameters from the memory. On the basis of all the above, the control device may control the air flow generating unit and/or the primary metering device so that a desired distribution rate is obtained.

In the case of a blockage occurring in one of the at least two ducts, the static pressure in the blocked duct will increase. The blockage in the duct may also affect the static pressure in unblocked ducts, since the product flow has to take different paths, in which the static pressure may decrease while the dynamic pressure increases. Consequently, the deviation between a blocked duct and an unblocked duct may thus increase with a relatively higher value than the actual increase of static pressure in the blocked duct itself. Thus, detection by comparison is more accurate than merely using static pressure threshold values. In the case of a leakage in one of the at least two ducts, the static pressure in the leaking duct will decrease. If the duct comprises a tube, and the tube has accidently been disconnected from the distribution unit, the static pressure in the duct, i.e. the tube, may drastically change. Such deviating pressure will easily be detected by the method as disclosed herein. The step of comparing the determined static pressures may comprise determining/calculating the static pressure deviation between the ducts.

According to an example, abnormal product flow is detected when the static pressure deviation exceeds a first threshold value. The first threshold value may be a predetermined threshold value. The first threshold value may be obtained by carrying out trial runs and/or experiments.

The first threshold value may correspond to a predetermined allowed static pressure deviation between the at least two ducts. The first threshold value may be stored in the memory of the control device. According to an example, the first threshold value may be expressed as a percentage. The first threshold value may for example be 5%, 10% or 20%. This means that if the static pressure in one duct deviates with more than 5%, 10% or 20% from the static pressure in another duct, an abnormal product flow is considered to have occurred in the deviating duct. The first threshold value may be an absolute value. If the static pressure deviation exceeds the first threshold value, the product flow will be considered abnormal and suitable actions as disclosed herein may be performed. The first threshold value may thus be selected and/or determined as a value corresponding to when there is a risk that an actual disturbance within the ducts has emerged. By selecting a suitable first threshold value, the degree of sensitivity of the detection method may easily be adjusted. The method may thus comprise setting/selecting the first threshold value. The first threshold value may be set/selected on the basis of the type of crop/agricultural product to be distributed and may be automatically set/selected.

According to an example, a normal deviation in static pressure representing a deviation during normal product flow is taken into account when comparing the determined static pressures. This means that certain variations of the static pressure deviation may be allowed and regarded as representing a normal condition. This normal deviation may be unique for each duct and/or each sensor unit. Normal deviations may arise due to variation of the length or cross-section of each duct, the specific sensor unit or other irregularities in the configuration. The normal deviation may be a predetermined parameter or a value obtained during calibration. The normal deviation may be accounted for when detecting abnormal product flow. This is favorable since it reduces the number of erroneously detected abnormal product flows.

According to an example, the method comprises a calibration step, in which the normal deviation is determined. Said calibration step comprises: determining the static pressure in each of the at least two ducts based on signals from the sensor units; and comparing the determined static pressures to determine the normal deviation, wherein the calibration step is performed when it is assumed that there is a normal product flow in the at least two ducts. This may, for example, be when the agricultural implement is first activated a day. By means of the calibration step, the current and unique normal deviation for each duct during normal product flow is determined. Calibration may be performed periodically in order to maintain the accuracy of the detection method. For example, calibration may be performed once daily or when the distributed agricultural product is changed.

According to an example, the method comprises activating an alarm when abnormal product flow is detected. The alarm may be activated by the control device. The alarm may be a visual alarm, an audible alarm, a tactile alarm and/or any other suitable type of alarm. The alarm may thus make the driver aware of that something is wrong with the product flow in at least one duct and action has to be taken. For example, a duct may have to be unclogged or a duct may have to be connected to the distributing unit. Activating an alarm is advantageous since necessary measures can be taken immediately and the risk of uneven distribution of agricultural product is reduced. Also, the time for maintenance may be reduced, if the origin of abnormal flow is discovered and attended to at an early stage.

According to an example, the method comprises controlling the air flow generating unit to increase the air flow through the first flow path when abnormal product flow is detected. By increasing the air flow through the first flow path when a detected abnormal product flow is detected, agricultural product and/or soil and/or dirt causing a blockage may be blown away and thus removed. The increase of the air flow may be initiated manually by the driver or automatically by the control unit. Controlling the air flow generating unit to increase the air flow through the first flow path is a suitable measure when the static pressure deviation is relatively small, due to a partial or smaller blockage in the duct. If the static pressure deviation is relatively large due to heavy blockage, an increase of the air flow to remove the blockage would likely have to be higher than the capacity of the flow generating unit. By means of increasing the air flow at a partial or lighter blockage, the blockage may be removed quickly and easy at an early stage, before a more severe blockage arise. The time for maintenance may thus be reduced, since the origin of abnormal flow is resolved at an early stage.

According to an example, the air flow generating unit is controlled to increase the air flow through the first flow path when the static pressure deviation exceeds the first threshold value and is below a second threshold value. The second threshold value may be a predetermined threshold value. The second threshold value may be empirically determined by carrying out trial runs and/or experiments. The method may thus comprise setting/selecting the second threshold value. The second threshold value may be set/selected on the basis of the type of crop/agricultural product to be distributed and may be automatically set/selected. The second threshold value may be stored in the memory of the control device. The second threshold value may correspond to a static pressure deviation where a blockage in the ducts may not be resolved by increasing the air flow, as previously described herein. Thus, an abnormal product flow and a static pressure deviation above a first threshold value but below a second threshold value may trigger initiation of increase of air flow through the first flow path by means of controlling the air flow generating unit. The method step may be initiated manually by the driver or automatically by the control unit. By means of controlling the air flow generating unit on the basis of the first and second threshold values, it is ensured that the desired corrective action is taken at the appropriate time.

According to an example, the method comprises controlling the primary metering device to stop providing any agricultural product to the air flow in the first flow path when abnormal product flow is detected. By terminating the supply of agricultural product to the air flow in the first flow path when an abnormal product flow is detected, potential negative effects arising from the cause of the current abnormal flow, such as blockage or leakage, are reduced. The termination of the supply of agricultural product may be initiated manually by the driver or automatically by the control unit. This method step is a suitable measure when the static pressure deviation is relatively large, due to heavy blockage in the ducts or a leakage. If the static pressure deviation is relatively large due to heavy blockage, a continued supply of agricultural product may aggravate the blockage and cause more problems. Thus, by stopping the supply of agricultural product to the feed system, an already blocked duct is not exposed to more product making the problem even worse. In the case of leakage, terminating the supply of agricultural product will reduce the leakage of agricultural product.

According to an example, the primary metering device is controlled to stop providing any agricultural product to the air flow in the first flow path when the static pressure deviation exceeds the second threshold value. Thus, an abnormal product flow and a static pressure deviation greater than the second threshold value may trigger initiation of the termination of agricultural product supply. The method step may be initiated manually by the driver or automatically by the control unit. By means of controlling the primary metering device on the basis of the second threshold value, it is ensured that corrective actions are taken at the appropriate time. Consequently, the time for maintenance may thus be reduced, since the origin of abnormal flow is resolved at an early stage.

As an example, when an abnormal product flow has been detected and the deviation exceeds the first threshold value an alarm may be activated. If the deviation is also below the second threshold value, the air flow generating unit may be controlled to increase the air flow through the first flow path. If the detected deviation is caused by a blockage, the blockage may be removed by means of the increased air flow and the deviation will decrease or disappear. When the deviation is below the first threshold value, the air flow generating unit may be controlled to provide the original/normal air flow through the first flow path. If the blockage is not removed, the deviation may increase due to increased blockage and may finally exceed the second threshold value. The primary metering device may then be controlled to stop providing any agricultural product to the air flow in the first flow path. The operator may subsequently manually identify and remove the cause of the deviation. However, if the detected deviation is caused by a leakage, increasing the air flow through the first flow path will rapidly cause a dramatically increased deviation. The deviation will this way rapidly exceed the second threshold value and the primary metering device may then be controlled to stop providing any agricultural product to the air flow in the first flow path. The steps of controlling the air flow generating unit to increase the air flow through the first flow path and controlling the primary metering device to stop providing any agricultural product may thus be performed almost simultaneously. The operator may subsequently manually identify and remove the cause of the deviation.

In another example, the detected deviation is immediately greater than the second threshold value, and the primary metering device is directly controlled to stop providing any agricultural product to the air flow in the first flow path.

According to an aspect of the disclosure, a computer program comprising instructions which, when the program is executed by a computer, cause the computer to carry out the method according to the method as disclosed herein is provided. By means of the computer program, an increased control and accuracy of the detection method may be obtained. The computer program causes the agricultural implement to perform the above methods steps when executed, with increased predictability and reproducibility.

According to an aspect of the disclosure, a computer-readable medium comprising instructions which, when executed by a computer, cause the computer to carry out the method according to the method as disclosed herein is provided. The computer-readable medium may be any tangible and/or non-transitory medium that may contain or store a program for execution by a processor.

According to an aspect of the disclosure, an agricultural implement comprising a feed system for distributing an agricultural product is provided. The feed system comprising: a first flow path; an air flow generating unit arranged in fluid communication with the first flow path; a primary metering device arranged to provide the agricultural product to the air flow in the first flow path; and at least one distribution unit connected to the first flow path downstream of the primary metering device, wherein the at least one distribution unit comprises at least two outlets, each connected to a separate duct for conveying the agricultural product to the ground, wherein the feed system further comprises sensor units arranged in at least two ducts, wherein the agricultural implement further comprises a control device configured to determine a static pressure in each of the at least two ducts based on signals from the sensor units; and compare the determined static pressures to detect whether any of the at least two ducts has a deviating static pressure, indicating an abnormal product flow in the duct.

It will be appreciated that all the examples described for the method aspect of the disclosure performed by the control device are also applicable to the agricultural implement aspect of the disclosure. That is, the agricultural implement comprising the control device may be configured to perform any one of the steps of the method according to the various examples described above.

Thus, the control device may be configured to detect abnormal product flow in a duct when the static pressure deviation is greater than a first threshold value. The control device may be configured to consider a normal deviation in static pressure representing a deviation during normal product flow in the ducts when comparing the determined static pressures. The control device may be configured to perform a calibration step to determine the normal deviation, the calibration step comprising determining the static pressure in each of the at least two ducts based on signals from the sensor units; and comparing the determined static pressures to determine the normal deviation, wherein the control device is configured to perform the calibration step when it is assumed that there is a normal product flow in the at least two ducts. The control device may be configured to activate an alarm when abnormal product flow is detected. The control device may be configured to control the air flow generating unit to increase the air flow through the first flow path when an abnormal product flow is detected. The control device may be configured to control the air flow generating unit to increase the air flow through the first flow path when the static pressure deviation is above the first threshold value and below a second threshold value. According to an example, the control device may be configured to control the primary metering device to stop providing any agricultural product to the air flow in the first flow path when abnormal product flow is detected. According to an example, the control device may be configured to control the primary metering device to stop providing any agricultural product to the air flow in the first flow path when the static pressure deviation is greater than the second threshold value.

It is to be understood that the control device may be implemented as a separate entity or distributed in two or more physical entities. The control device may comprise one or more control units and/or computers. The control device may thus be implemented or realised by the control device comprising a processor and a memory, the memory comprising instructions, which when executed by the processor causes the control device to perform the herein disclosed method steps. Effects and features of the aspects relating to the control device correspond to those described above in connection with the method. Also, examples mentioned in relation to the method are compatible with the agricultural implement/control device aspect, and vice versa.

The present disclosure will now be further illustrated with reference to the appended figures, wherein for the sake of clarity and understanding of the disclosure some details of no importance for the understanding of the invention are deleted from the figures. Moreover, the figures shall not be considered drawn to scale as some features may be exaggerated in order to more clearly illustrate the disclosure. In the figures, some preferred examples of the present disclosure are shown. The invention may, however, be embodied in other forms and should not be construed as limited to the herein disclosed examples. The disclosed examples are provided to fully convey the scope of the disclosure to the skilled person.

Figure 1:
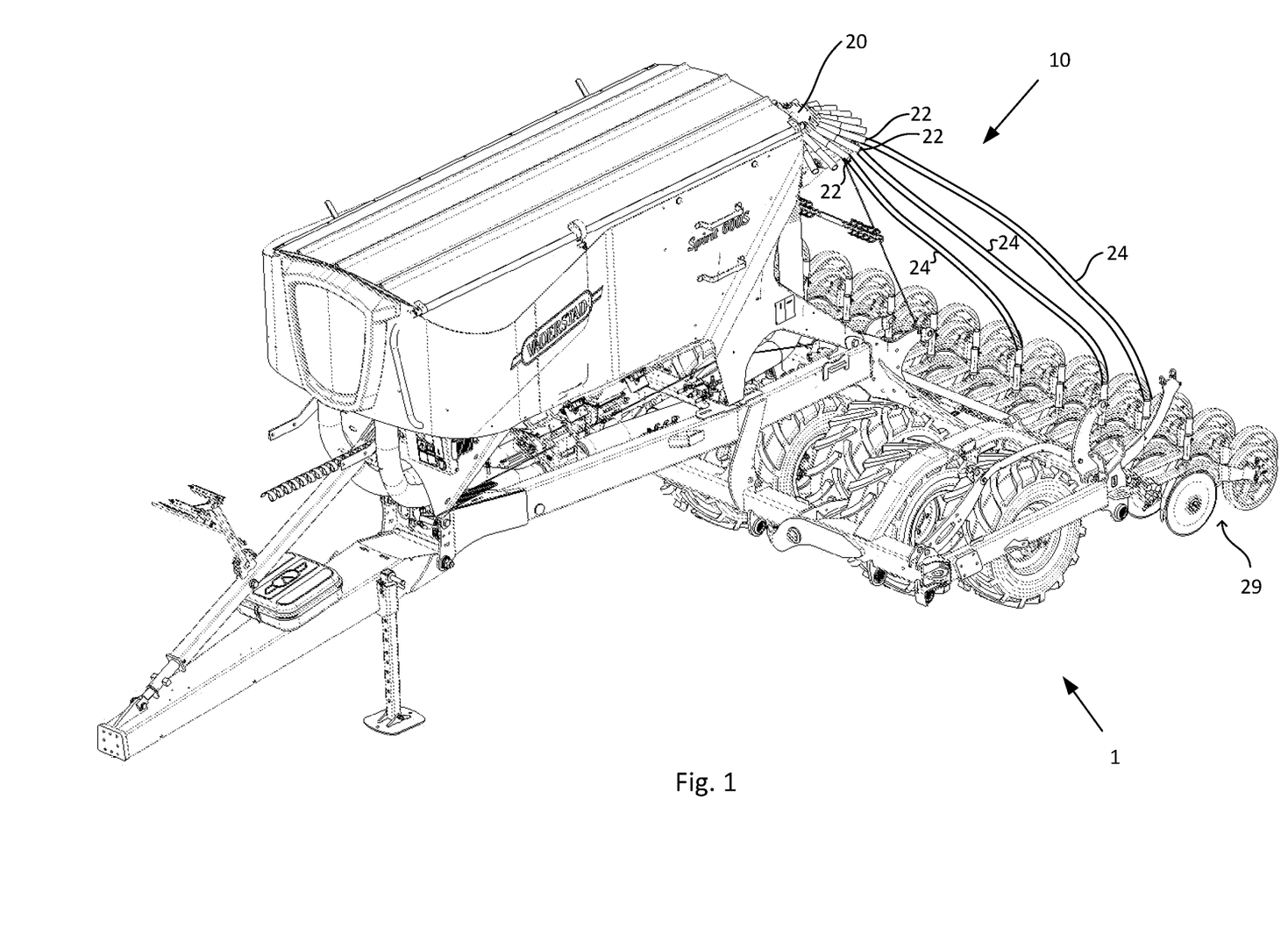
FIG. 1 schematically illustrates an agricultural implement according to an example of the present disclosure.

FIG. 1 schematically illustrates a perspective view of an agricultural implement 1 according to an example of the present disclosure. The agricultural implement 1 comprises a feed system 10 for distributing an agricultural product. The feed system 10 will be further described in relation to FIGS. 2a-2b and FIGS. 3a-3b, which schematically illustrates different configurations of the feed system 10 according to examples of the present disclosure.

The agricultural implement 1 as shown in FIG. 1 is illustrated as a seed drill. However, the agricultural implement may comprise a planter, a fertilizing applicator, a pesticide applicator and/or any other similar devices. The agricultural product to be distributed by means of the agricultural implement 1 may comprise seeds, fertilizer, pesticides and/or other similar products. In FIG. 1, the distribution unit 20 is schematically illustrated as a distribution head distributing the agricultural product via numerous outlets 22. Each outlet 22 of the distribution unit 20 may be connected to a first end of a separate duct 24 leading the agricultural product to coulters 29 and/or the ground. In FIG. 1, only three ducts 24 are schematically illustrated. However, a separate duct 24 may be arranged at each outlet 22 from the distribution unit 20. The second end of each duct 24 may be arranged in association with a coulter 29 and/or some sort of outlet nozzle and is thus arranged close to the soil in order to discharge the agricultural product.

Figure 2A:
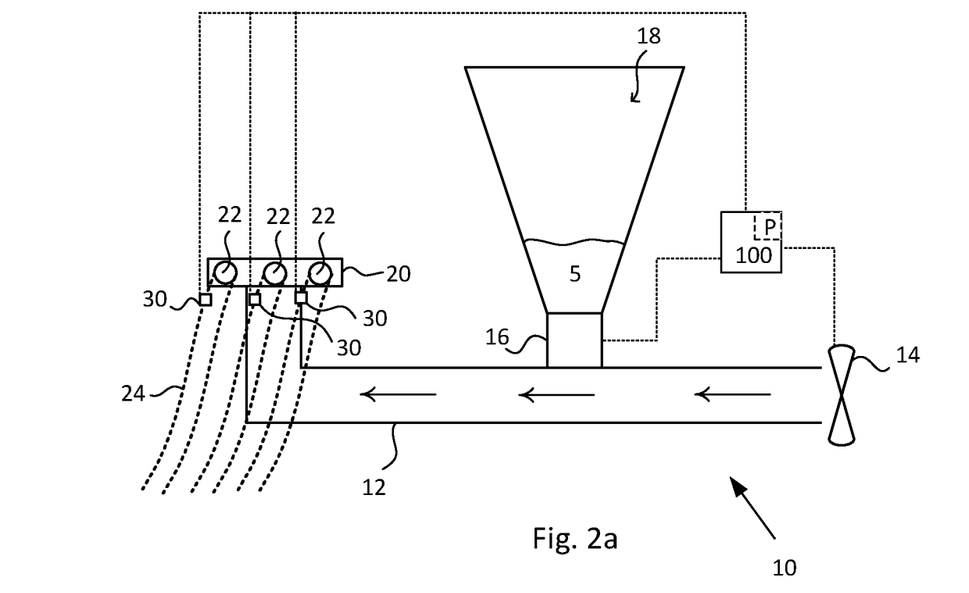
FIGS. 2a-2b schematically illustrate a feed system of an agricultural implement according to examples of the present disclosure.

FIG. 2a schematically illustrates a side view of a feed system 10 of an agricultural implement 1 according to an example of the present disclosure. The agricultural implement 1 may be configured as disclosed in FIG. 1. The feed system 10 comprises: a first flow path 12; an air flow generating unit 14 arranged in fluid communication with the first flow path 12; a primary metering device 16 arranged to provide an agricultural product 5 to the air flow in the first flow path 12; and at least one distribution unit 20 connected to the first flow path 12 downstream of the primary metering device 16. The at least one distribution unit 20 comprises at least two outlets 22, each connected to a separate duct 24 for conveying the agricultural product 5 to the ground, wherein the feed system 10 further comprises sensor units 30 arranged in at least two ducts 24. The feed system 10 may also comprise a control device 100. The control device 100 may be configured to determine a static pressure in each of the at least two ducts 24 based on signals from the sensor units 30; and compare the determined static pressures to detect whether any of the at least two ducts 24 has a deviating static pressure, indicating an abnormal product flow in the duct 24.

As illustrated in FIG. 2a, the primary metering device 16 may be arranged downstream of the air flow generating unit 14 and upstream of the distribution unit 20. The primary metering device 16 may be configured to discharge the agricultural product 5 into the air flow generated by the air flow generating unit 14. The primary metering device 16 may be controlled to regulate the amount of agricultural product 5 supplied into the air flow in the first flow path 12. The primary metering device 16 may be arranged to feed agricultural product 5 from a product chamber 18 into the first flow path 12 for feeding the agricultural product 5 to the ducts 24. The product chamber 18 may be a seed box or a fertilizer box. The product chamber 18 may be a combined seed and fertilizer box, accommodating a chamber for seeds and a chamber for fertilizer. The primary metering device 16 may comprise a rotating dosing element, such as rotating a cell wheel or a feed screw.

Downstream of the primary metering device 16, the feed system 10 may comprise one or more distribution units 20 with a plurality of outlets 22.

In FIG. 2a, the distribution unit is schematically illustrated as a distribution head, receiving the agricultural product 5 from below and distributing the agricultural product 5 radially/laterally via numerous outlets 22. Each outlet 22 of the distribution unit 20 may be connected to a first end of a separate duct 24 leading the agricultural product 5 to coulters and/or the ground. The second end of each duct 24 may be arranged in association with a coulter and/or some sort of outlet nozzle and is thus arranged close to the soil in order to discharge the agricultural product 5.

According to another example, the feed system 10 may comprise multiple first flow paths 12 (not shown). The multiple first flow paths 12 may each have a separate air flow generating device 14, or share the same air flow generating device 14. The multiple first flow paths 12 may each have a separate primary metering device 16, or share the same primary metering device 16.

The sensor units 30 may be arranged in at least two ducts 24, wherein at least one sensor unit is arranged in each of the at least two ducts 24. The sensor units 30 may be arranged in association with the distribution unit 20. Each sensor unit 30 may be arranged in the periphery of the duct 24. According to an example, there may be more than one sensor unit 30 in each duct 24 (not shown).

The control device 100 may be configured to detect abnormal product flow in the agricultural implement 1. The control device 100 may be arranged to receive signals corresponding to the static pressure in the at least two ducts 24 from the sensor units 30. The control device 100 may be arranged in communication with the air flow generating unit 14, the primary metering device 16 and the sensor units 30. The control device 100 may also be arranged in communication with a speed sensor (not shown) for determining the current speed of the agricultural implement 1 or the current speed of the tractor or working vehicle hauling the agricultural implement 1.

Figure 2B:
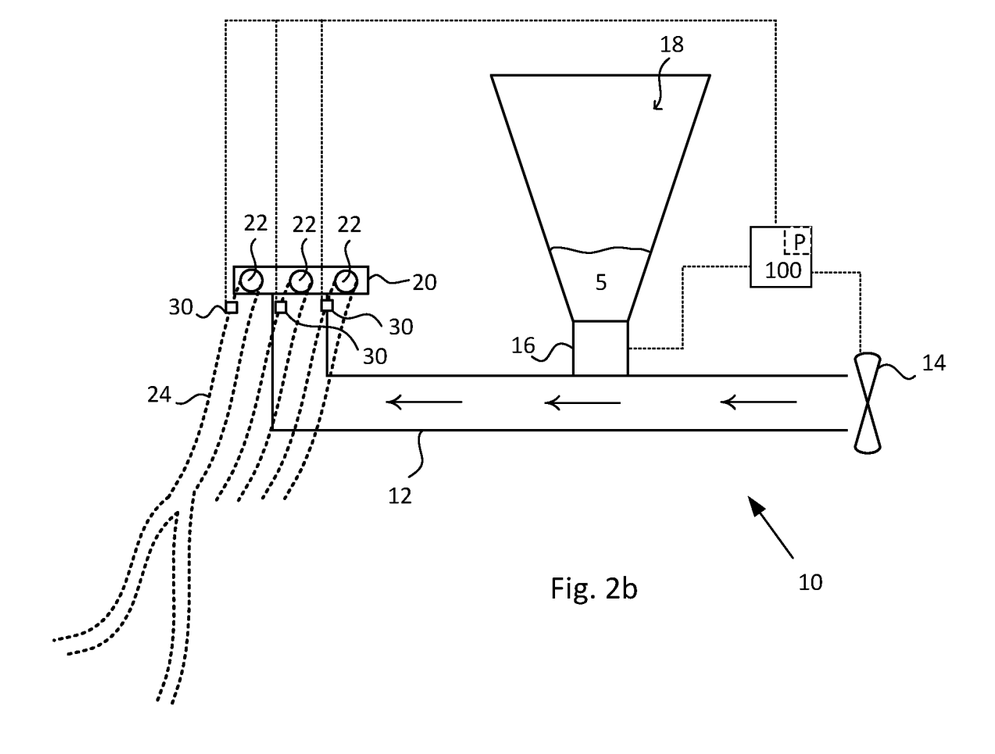

FIG. 2b schematically illustrates a side view of a feed system 10 of an agricultural implement 1 according to an example of the present disclosure. The agricultural implement 1 may be configured as disclosed in FIG. 1 and the feed system 10 may be configured as disclosed in FIG. 2a with the difference that one or more of the at least two separate ducts 24 may branch out and split into multiple sub-ducts.

Figure 3A:
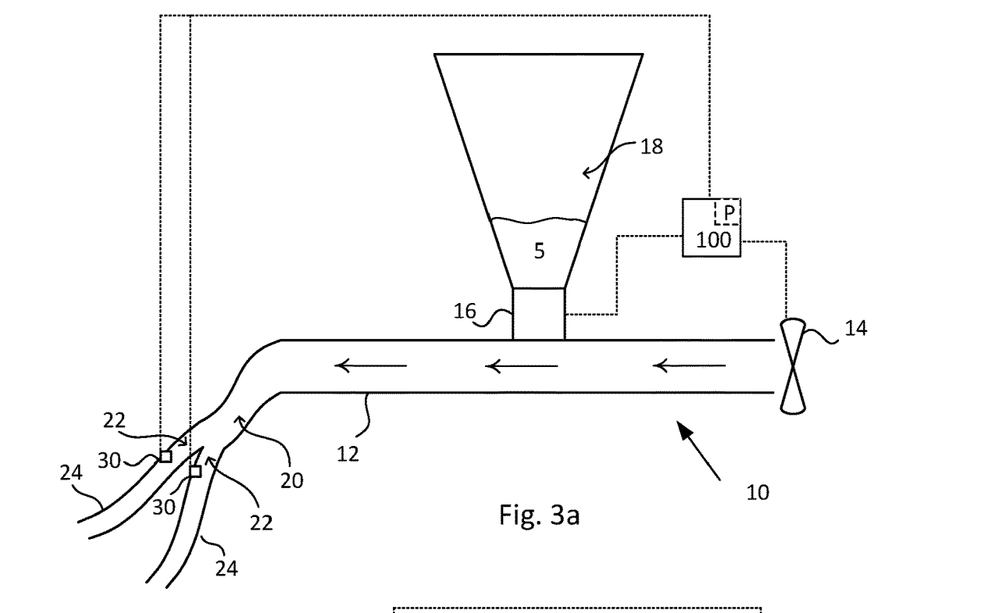
FIGS. 3a-3b schematically illustrate a feed system of an agricultural implement according to examples of the present disclosure.

FIG. 3a schematically illustrates a side view of a feed system 10 of an agricultural implement 1 according to an example of the present disclosure. The agricultural implement 1 may be configured as disclosed in FIG. 1. The feed system 10 comprises: a first flow path 12; an air flow generating unit 14 arranged in fluid communication with the first flow path 12; a primary metering device 16 arranged to provide the agricultural product 5 to the air flow in the first flow path 12; and at least one distribution unit 20 connected to the first flow path 12 downstream of the primary metering device 16. The at least one distribution unit 20 comprises at least two outlets 22, each connected to a separate duct 24 for conveying the agricultural product 5 to the ground, wherein the feed system 10 further comprises sensor units 30 arranged in at least two ducts 24. The feed system 10 may further comprise a control device 100. The control device 100 may be configured to determine a static pressure in each of the at least two ducts 24 based on signals from the sensor units 30; and compare the determined static pressures to detect whether any of the at least two ducts 24 has a deviating static pressure, indicating an abnormal product flow in the duct 24.

The feed system 10 as disclosed in FIG. 3a comprises a distribution unit 20 comprising two outlets 22. The distribution unit 20 is here formed as a branch or transition, where the first flow path 12 splits into the two ducts 24.

Figure 3B:
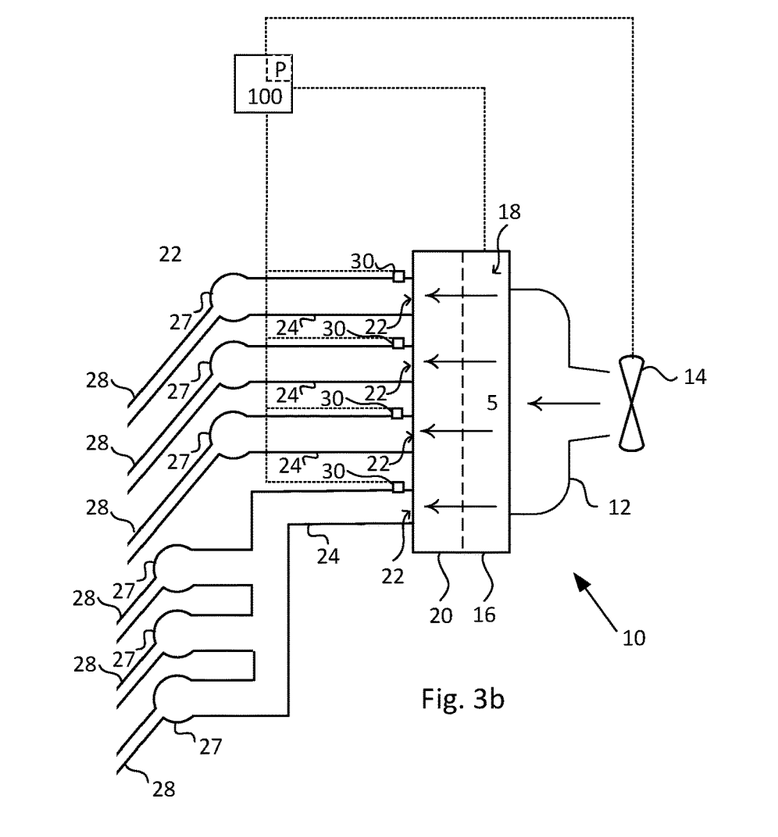

FIG. 3b schematically illustrate a top view of a feed system 10 of an agricultural implement 1 according to an example of the present disclosure. The agricultural implement 1 may be configured as disclosed in FIG. 1. The feed system 10 comprises: a first flow path 12; an air flow generating unit 14 arranged in fluid communication with the first flow path 12; a primary metering device 16 arranged to provide the agricultural product 5 to the air flow in the first flow path 12; and at least one distribution unit 20 connected to the first flow path 12 downstream of the primary metering device 16. The at least one distribution unit 20 comprises at least two outlets 22, each connected to a separate duct 24 for conveying the agricultural product 5 to the ground, wherein the feed system 10 further comprises sensor units 30 arranged in at least two ducts 24. A control device 100 of the feed system 10 and thus the agricultural implement 1 may be configured to determine a static pressure in each of the at least two ducts 24 based on signals from the sensor units 30; and compare the determined static pressures to detect whether any of the at least two ducts 24 has a deviating static pressure, indicating an abnormal product flow in the duct 24.

According to the example illustrated in FIG. 3b, the primary metering device 16 and the distribution unit 20 may be comprised in a single entity. According to an example, the primary metering device 16, the distribution unit 20 and the product chamber 18 may be comprised in a single entity. According to the example illustrated in FIG. 3b, the agricultural product 5 may be supplied to the single entity comprising a primary metering device 16 and a distribution unit 20. The agricultural product 5 may then end up at the bottom of the single entity due to gravity. The air flow generating unit 14 generates an air flow blowing over the agricultural product 5. The air flow conveys the agricultural product 5 into the ducts 24 via the outlets 22. As illustrated in FIG. 3b, the ducts 24 may comprise a secondary metering device 27 where agriculture product 5 is assembled. From the secondary metering device 27, agricultural product 5 is evenly discharged and transported towards the ground in a passage 28, e.g. one seed at the time.

It is to be understood that the agricultural implement 1 as disclosed in FIG. 3b shows two different variants and the agricultural implement 1 could comprise either a plurality of ducts 24, each connected to one secondary metering device 27, or the agricultural implement 1 could comprise one or more ducts 24, which each is connected to a plurality of secondary metering devices 27.

According to the examples illustrated in FIGS. 2a-2b and FIGS. 3a-3b, the control device 100 may be configured to detect abnormal product flow in a duct 24 when the static pressure deviation is greater than a first threshold value. According to an example, the control device 100 may be configured to consider a normal deviation in static pressure representing a deviation during normal product flow in the ducts 24 when comparing the determined static pressures. According to an example, the control device 100 may be configured to perform a calibration step to determine the normal deviation, the agricultural comprises determining the static pressure in each of the at least two ducts 24 based on signals from the sensor units 30; and comparing the determined static pressures to determine the normal deviation, wherein the control device 100 is configured to perform the calibration step when it is assumed that there is a normal product flow in the at least two ducts 24.

According to an example, the control device 100 may be configured to activate an alarm when abnormal product flow is detected. According to an example, the control device 100 may be configured to control the air flow generating unit 14 to increase the air flow through the first flow path 12 when abnormal product flow is detected. According to an example, the control device 100 may be configured to control the air flow generating unit 14 to increase the air flow through the first flow path 12 when the static pressure deviation is above the first threshold value and below a second threshold value. According to an example, the control device 100 may be configured to control the primary metering device 16 to stop providing any agricultural product 5 to the air flow in the first flow path 12 when abnormal product flow is detected. According to an example, the control device 100 may be configured to control the primary metering device 16 to stop providing any agricultural product 5 to the air flow in the first flow path 12 when the static pressure deviation is greater than a second threshold value.

It is to be understood that the control device 100 may be implemented as a separate entity or distributed in two or more physical entities. The control device 100 may comprise one or more control units and/or computers. The control device 100 may thus be implemented or realised by the control device 100 comprising a processor and a memory, the memory comprising instructions, which when executed by the processor causes the control device 100 to perform the herein disclosed method steps.

Figure 4A:
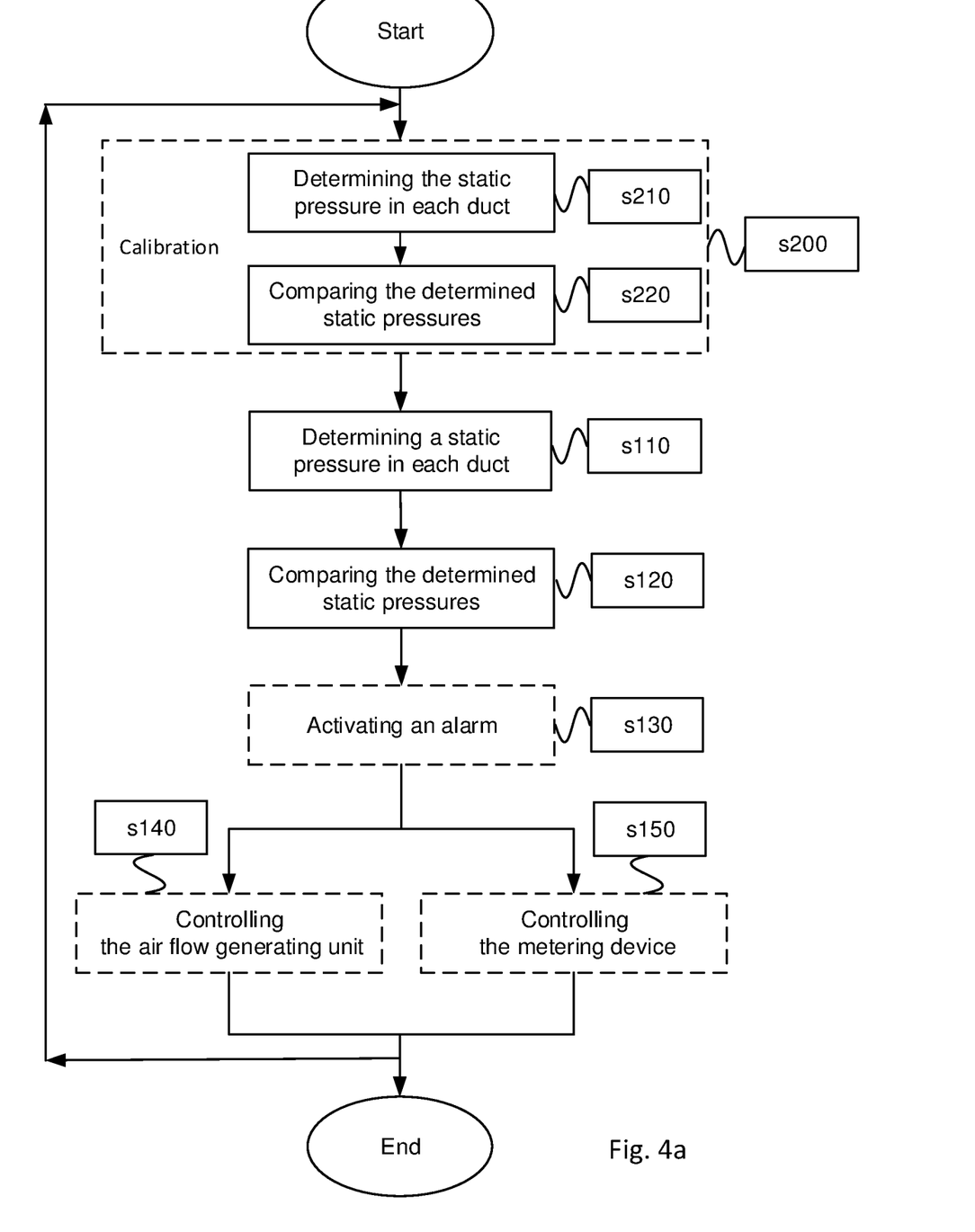
FIG. 4a-b schematically illustrate flowcharts of a method for detecting abnormal flow in an agricultural implement according to examples of the present disclosure.

FIG. 4a schematically illustrates a block diagram of a method for detecting abnormal product flow in an agricultural implement 1 according to an example of the present disclosure. The method may relate to the agricultural implement 1 as disclosed in FIG. 1. The agricultural implement 1 comprises a feed system 10 for an agricultural product 5, as shown in FIG. 2a-2b or 3a-3b. The feed system 10 comprises a first flow path 12; an air flow generating unit 14 arranged in fluid communication with the first flow path 12; a primary metering device 16 arranged to provide the agricultural product 5 to the air flow in the first flow path 12; and at least one distribution unit 20 connected to the first flow path 12 downstream of the primary metering device 16. The at least one distribution unit 20 comprises at least two outlets 22, each connected to a separate duct 24 for conveying the agricultural product 5 to the ground. The feed system 10 further comprises sensor units 30 arranged in at least two ducts 24. The method comprises the steps of: determining s110 a static pressure in each of the at least two ducts 24 based on signals from the sensor units 30; and comparing s120 the determined static pressures to detect whether any of the at least two ducts 24 has a deviating static pressure, indicating an abnormal product flow in the duct 24. The method steps are shown in FIG. 4.

By means of the method step of determining s110 a static pressure in each of the at least two ducts 24 based on signals from the sensor units 30, a value of current static pressure in each of the at least two ducts 24 are determined. By comparing s120 the determined values of static pressures, deviating static pressure in any of the at least two ducts 24 is detected. The deviation thus corresponds to, and indicates, an abnormal product flow in the duct 24 with a deviating static pressure. The step of comparing s120 the determined values of static pressures may comprise determining/calculating the static pressure deviation between the ducts 24. Abnormal product flow in the duct 24 may be caused by blockage and/or leakage in the duct 24.

According to an example, an abnormal product flow may be detected when the static pressure deviation exceeds a first threshold value. The step of comparing s120 the determined values of static pressures may thus comprise determining if the static pressure deviation exceeds a first threshold value. According to an example, a normal deviation in static pressure representing a deviation during normal product flow may be taken into account when comparing s120 the determined static pressures.

The method may optionally comprise a calibration step s200, in which the normal deviation is determined. The calibration step s200 comprises: determining s210 the static pressure in each of the at least two ducts 24 based on signals from the sensor units 30; and comparing s220 the determined static pressures to determine the normal deviation, wherein the calibration step s200 is performed when it is assumed that there is a normal product flow in the at least two ducts 24.

The method may optionally comprise the step of activating 130 an alarm when abnormal product flow is detected. The method may optionally comprise the step of controlling s140 the air flow generating unit 14 to increase the air flow through the first flow path 12 when abnormal product flow is detected. According to an example, the air flow generating unit 14 is controlled to increase the air flow through the first flow path 12 when the static pressure deviation is above the first threshold and below a second threshold value. The method may optionally comprise the step of controlling s150 the primary metering device 16 to stop providing any agricultural product 5 to the air flow in the first flow path 12 when abnormal product flow is detected. According to an example, the primary metering device 5 is controlled to stop providing any agricultural product 5 to the air flow in the first flow path 12 when the static pressure deviation is greater than the second threshold value.

Figure 4B:
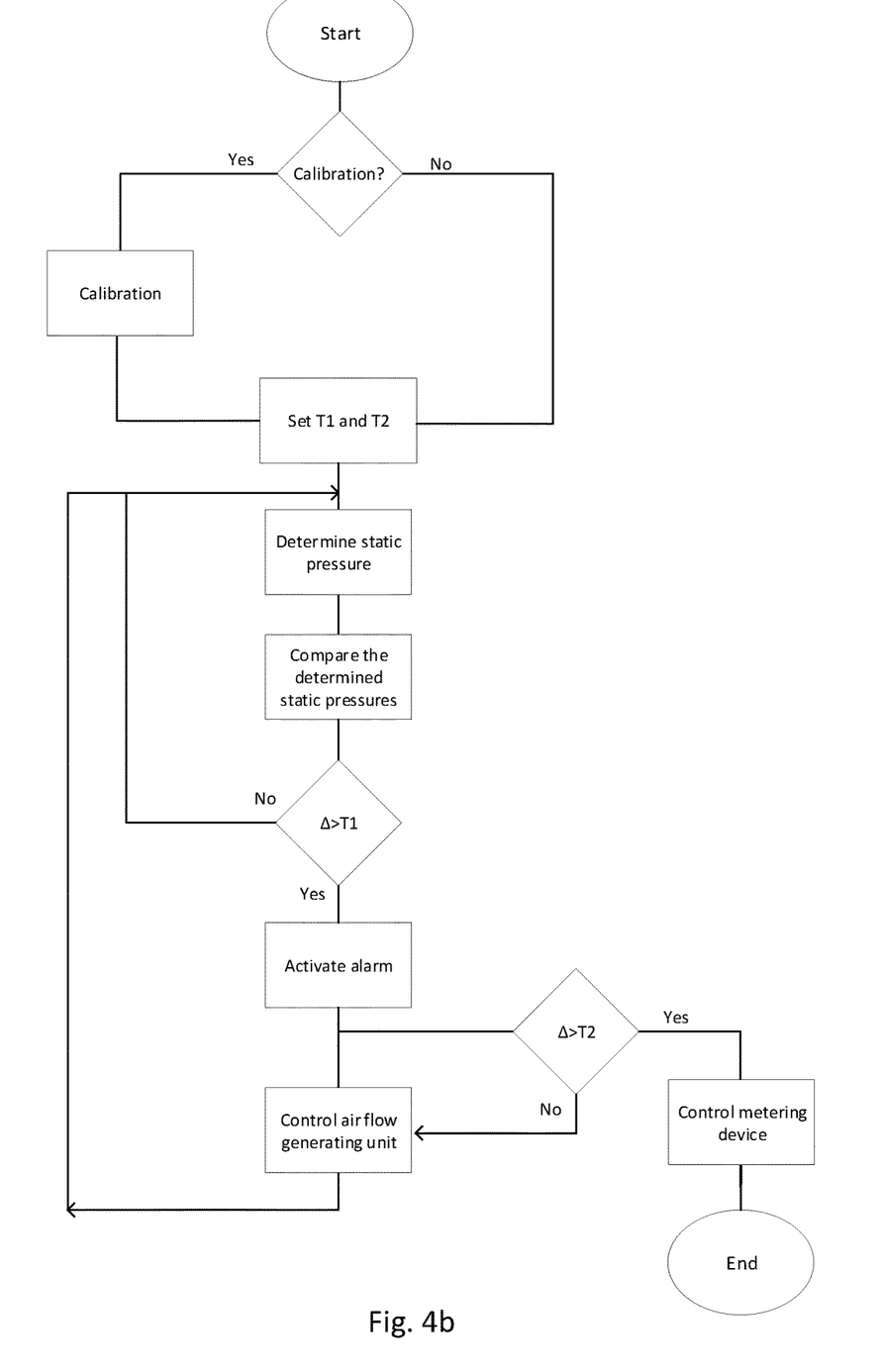

FIG. 4b schematically illustrates a block diagram of a method for detecting abnormal product flow in an agricultural implement 1 according to an example of the present disclosure. The method may relate to the agricultural implement 1 as disclosed in FIG. 1. The method comprises the method steps as disclosed in FIG. 4a but is here disclosed as a more detailed iterative process.

The method may comprise determining if calibration s200 is required or not. If so, the calibration steps of determining s210 the static pressure in each duct 24 and comparing s220 the determined static pressures are performed. Determining if calibration is required or not may form part of the calibration step s200 as disclosed in FIG. 4a. Typically, calibration s200 is required if it is the first time of the day that the agricultural implement 1 is activated or if the agricultural product 5 to be distributed has changed. The method may further comprise the step of setting a first threshold value T1 and a second threshold value T2. The first threshold value T1 may correspond to a predetermined allowed static pressure deviation between the at least two ducts 24. The first threshold value T1 may be expressed as a percentage. The first threshold value T1 may be an absolute value. The second threshold value T2 may correspond to a static pressure deviation where a blockage in the ducts 24 may not be resolved by increasing the air flow. The second threshold value T2 may be automatically set/selected on the basis of the type of crop/agricultural product 5 to be distributed. Setting the first threshold value T1 and the second threshold value T2 may form part of the method step of determining s110 a static pressure in each of the at least two ducts 24 based on signals from the sensor units 30 or comparing s120 the determined static pressures to detect whether any of the at least two ducts 24 has a deviating static pressure, indicating an abnormal product flow in the duct 24 as disclosed in FIG. 4a.

When the steps of determining s110 a static pressure in each of the at least two ducts 24 and comparing s120 the determined static pressures have been performed, it may be determined whether the static pressure deviation Δ exceeds the first threshold value T1. If not, the previous method steps are repeated. If the deviation Δ exceeds the first threshold value T1, an alarm may be activated s130. Determining whether the static pressure deviation Δ is below or exceeds the first threshold value T1 may form part of the step of comparing s120 the determined static pressures to detect whether any of the at least two ducts 24 has a deviating static pressure as disclosed in FIG. 4a. Thus, if the static pressure deviation Δ exceeds the first threshold value T1, the product flow will be considered abnormal and suitable actions as disclosed herein may be performed.

The method may further comprise determining if the static pressure deviation Δ is greater than a second threshold value T2. If the static pressure deviation Δ is below the second threshold value T2, the air flow generating unit 14 may be controlled s140 to increase the air flow through the first flow path 12. If the static pressure deviation Δ exceeds the second threshold value T2 the primary metering device 16 may be controlled s150 to stop providing any agricultural product 5 to the air flow in the first flow path 12.

According to an example, a computer program P comprising instructions which, when the program is executed by a computer, causes the computer to perform the method as disclosed herein is provided. The computer program P is schematically illustrated in FIGS. 2a-2b and 3a-3b. According to an example, a computer-readable medium comprising instructions, which when executed by a computer, causes the computer to carry out the method as disclosed herein is provided.

The foregoing description of the preferred examples of the present disclosure is provided for illustrative and descriptive purposes. It is not intended to be exhaustive or to restrict the invention to the variants described. Many modifications and variations will obviously be apparent to one skilled in the art. The examples of the present disclosure have been chosen and described in order best to explain the principles of the invention and its practical applications and hence make it possible for specialists to understand the invention for various embodiments and with the various modifications appropriate to the intended use.

The invention claimed is:

1. A method, performed by a control device (100), for detecting abnormal product flow in an agricultural implement (1) comprising a feed system (10) for an agricultural product (5), the feed system (10) comprising: a first flow path (12); an air flow generating unit (14) arranged in fluid communication with the first flow path (12); a primary metering device (16) arranged to provide the agricultural product (5) to the air flow in the first flow path (12); and at least one distribution unit (20) connected to the first flow path (12) downstream of the primary metering device (16), wherein the at least one distribution unit (20) comprises at least two outlets (22), each connected to a separate duct (24) for conveying the agricultural product (5) to the ground, wherein the feed system (10) further comprises sensor units (30) arranged in at least two ducts (24), the method comprising:
    determining (s110) a static pressure in each of the at least two ducts (24) based on signals from the sensor units (30); and
    comparing (s120) the determined static pressures to detect whether any of the at least two ducts (24) has a deviating static pressure, indicating an abnormal product flow in said duct (24).

2. The method according to claim 1, wherein abnormal product flow is detected when the static pressure deviation (Δ) exceeds a first threshold value (T1).

3. The method according to claim 1, wherein at least one normal deviation in static pressure representing a variation in the static pressure between the different ducts during normal product flow is taken into account when comparing the determined static pressures.

4. The method according to claim 3, further comprising a calibration step (s200), in which the at least one normal deviation is determined, said calibration step (s200) comprising:
    determining (s210) the static pressure in each of the at least two ducts (24) based on signals from the sensor units (30); and
    comparing (s220) the determined static pressures to determine the normal deviation, wherein the calibration step (s200) is performed when it is assumed that there is a normal product flow in the at least two ducts (24).

5. The method according to claim 1, further comprising: activating (130) an alarm when abnormal product flow is detected.

6. The method according to claim 1, further comprising: controlling (s140) the air flow generating unit (14) to increase the air flow through the first flow path (12) when abnormal product flow is detected.

7. The method according to claim 2, wherein the air flow generating unit (14) is controlled (s140) to increase the air flow through the first flow path (12) when the static pressure deviation (Δ) exceeds the first threshold value (T1) and is below a second threshold value (T2).

8. The method according to claim 1, further comprising: controlling (s150) the primary metering device (16) to stop providing any agricultural product (5) to the air flow in the first flow path (12) when abnormal product flow is detected.

9. The method according to claim 8, wherein the primary metering device (16) is controlled (s150) to stop providing any agricultural product (5) to the air flow in the first flow path (12) when the static pressure deviation (Δ) is greater than a second threshold value (T2), said second threshold value being higher than a first threshold value indicating detection of abnormal product flow.

10. A computer program (P) comprising instructions which, when the program is executed by a computer, cause the computer to carry out the method according to claim 1.

11. A computer-readable medium comprising instructions which, when executed by a computer, cause the computer to carry out the method according to claim 1.

* * * * *